United States Patent
Holovacs et al.

(10) Patent No.: US 8,713,342 B2
(45) Date of Patent: Apr. 29, 2014

(54) SYSTEM AND METHOD FOR EFFICIENT ASSOCIATION OF A POWER OUTLET AND DEVICE

(75) Inventors: Jayson T. Holovacs, Dunellen, NJ (US); Neil Weinstock, Randolph, NJ (US); Siva Somasundaram, Dayton, NJ (US)

(73) Assignee: Raritan Americas, Inc., Somerset, NJ (US)

( * ) Notice: Subject to any disclaimer, the term of this patent is extended or adjusted under 35 U.S.C. 154(b) by 842 days.

(21) Appl. No.: 12/112,435

(22) Filed: Apr. 30, 2008

(65) Prior Publication Data

US 2009/0273334 A1 Nov. 5, 2009

(51) Int. Cl.
*G06F 1/26* (2006.01)
*G06F 15/177* (2006.01)

(52) U.S. Cl.
USPC .............................................. 713/340; 713/1

(58) Field of Classification Search
None
See application file for complete search history.

(56) References Cited

U.S. PATENT DOCUMENTS

| | | | |
|---|---|---|---|
| 4,321,582 A | 3/1982 | Banghart | |
| 4,543,649 A | 9/1985 | Head et al. | |
| 4,955,821 A * | 9/1990 | Bernardini | 439/133 |
| 5,515,853 A | 5/1996 | Smith et al. | |
| 5,719,800 A | 2/1998 | Mittal et al. | |
| 5,964,879 A | 10/1999 | Dunstan et al. | |
| 6,167,330 A | 12/2000 | Linderman | |
| 6,229,899 B1 | 5/2001 | Norris et al. | |
| 6,413,104 B1 | 7/2002 | Bernardini | |
| 6,476,728 B1 | 11/2002 | Sakakibara | |
| 6,499,102 B1 | 12/2002 | Ewertz | |
| 6,553,336 B1 | 4/2003 | Johnson et al. | |
| 6,567,769 B2 | 5/2003 | Chang | |
| 6,697,300 B1 | 2/2004 | Holt | |
| 6,983,210 B2 | 1/2006 | Matsubayashi | |
| 6,985,697 B2 | 1/2006 | Smith | |
| 6,986,069 B2 | 1/2006 | Oehler et al. | |
| 7,032,119 B2 | 4/2006 | Fung | |
| 7,248,978 B2 | 7/2007 | Ransom | |
| 7,272,735 B2 | 9/2007 | Fung | |
| 7,295,556 B2 | 11/2007 | Roese et al. | |
| 7,444,526 B2 | 10/2008 | Felter et al. | |
| 7,802,120 B2 | 9/2010 | Conroy et al. | |

(Continued)

FOREIGN PATENT DOCUMENTS

| | | |
|---|---|---|
| EP | 1489719 | 12/2004 |
| GB | 2423168 | 8/2006 |

(Continued)

OTHER PUBLICATIONS

The International Search Report and Written Opinion by the International Searching Authority, issued on Nov. 25, 2009, in the PCT application No. PCT/US09/61521.

(Continued)

*Primary Examiner* — Dennis M Butler

(57) ABSTRACT

A system and method for providing automatic or semi-automatic identity association between an outlet of an intelligent power distribution unit and a target device, such as a computer server, which is powered by that outlet. The association is accomplished by enabling identification information to be transmitted between a memory device near or within the target device and the intelligent power distribution unit via a power cable. The power cable may include a specialized interface for mating with the power distribution unit and/or providing the identification information.

26 Claims, 7 Drawing Sheets

(56) References Cited

U.S. PATENT DOCUMENTS

| | | | |
|---|---|---|---|
| 7,853,816 | B2 | 12/2010 | Tanaka |
| 2002/0007463 | A1 | 1/2002 | Fung |
| 2002/0156600 | A1 | 10/2002 | Chang |
| 2003/0124999 | A1 | 7/2003 | Parssinen |
| 2003/0193777 | A1 | 10/2003 | Friedrich |
| 2003/0204759 | A1 | 10/2003 | Singh |
| 2004/0003303 | A1 | 1/2004 | Oehler |
| 2004/0051397 | A1 | 3/2004 | Juntunen |
| 2004/0064745 | A1 | 4/2004 | Kadambi |
| 2004/0163001 | A1 | 8/2004 | Bodas |
| 2004/0167732 | A1 | 8/2004 | Spitaels |
| 2004/0267897 | A1 | 12/2004 | Hill |
| 2005/0102539 | A1 | 5/2005 | Hepner |
| 2005/0143865 | A1 | 6/2005 | Gardner |
| 2005/0223090 | A1 | 10/2005 | Ewing |
| 2005/0283624 | A1 | 12/2005 | Kumar |
| 2006/0005057 | A1 | 1/2006 | Nalawadi |
| 2006/0013070 | A1 | 1/2006 | Holm |
| 2006/0072271 | A1* | 4/2006 | Jones et al. ............... 361/93.1 |
| 2006/0085854 | A1 | 4/2006 | Agrawal et al. |
| 2006/0103504 | A1* | 5/2006 | Vassallo ............... 340/5.92 |
| 2006/0112286 | A1 | 5/2006 | Whalley |
| 2006/0168975 | A1 | 8/2006 | Malone et al. |
| 2006/0184935 | A1 | 8/2006 | Abels |
| 2006/0184936 | A1 | 8/2006 | Abels |
| 2006/0184937 | A1 | 8/2006 | Abels |
| 2006/0259621 | A1 | 11/2006 | Ranganathan |
| 2006/0265192 | A1 | 11/2006 | Turicchi |
| 2006/0288241 | A1 | 12/2006 | Felter |
| 2007/0010916 | A1 | 1/2007 | Rodgers |
| 2007/0019626 | A1 | 1/2007 | Lahiri |
| 2007/0038414 | A1 | 2/2007 | Rasmussen |
| 2007/0040582 | A1 | 2/2007 | Gross |
| 2007/0078635 | A1 | 4/2007 | Rasmussen |
| 2007/0136453 | A1 | 6/2007 | Ewing |
| 2007/0150215 | A1 | 6/2007 | Spitaels |
| 2007/0180117 | A1 | 8/2007 | Matsumoto |
| 2007/0240006 | A1 | 10/2007 | Fung |
| 2007/0245165 | A1 | 10/2007 | Fung |
| 2007/0260897 | A1 | 11/2007 | Cochran |
| 2007/0273208 | A1 | 11/2007 | Menas |
| 2008/0052145 | A1 | 2/2008 | Kaplan |
| 2008/0148075 | A1* | 6/2008 | Reder ............... 713/300 |
| 2008/0170471 | A1 | 7/2008 | Rolet et al. |
| 2008/0238404 | A1* | 10/2008 | Ferguson ............... 324/76.11 |
| 2008/0244281 | A1 | 10/2008 | Felter |
| 2008/0270077 | A1 | 10/2008 | Ozonat et al. |
| 2008/0317021 | A1 | 12/2008 | Ives |
| 2009/0207694 | A1 | 8/2009 | Guigne |
| 2009/0234512 | A1 | 9/2009 | Ewing |

FOREIGN PATENT DOCUMENTS

| | | |
|---|---|---|
| GB | 2437846 | 11/2007 |
| JP | 05-250188 | 9/1993 |
| JP | 6221649 | 8/1994 |
| JP | 2005198364 | 7/2005 |
| JP | 2005323438 | 11/2005 |
| JP | 2006025474 | 1/2006 |
| JP | 2007139523 | 6/2007 |
| JP | 2007299624 | 11/2007 |
| WO | 2004074983 | 9/2004 |
| WO | 2006/089905 | 8/2006 |
| WO | 2006119248 | 11/2006 |
| WO | 2007072458 | 1/2007 |
| WO | 2007021392 | 2/2007 |
| WO | 2007024403 | 3/2007 |
| WO | 2010048205 | 4/2010 |

OTHER PUBLICATIONS

The International Search Report and Written Opinion by the International Searching Authority, issued on Apr. 21, 2009, in the PCT application No. PCT/US09/36299.

The International Search Report and Written Opinion by the International Searching Authority, issued on Sep. 8, 2008, in the PCT application No. PCT/US08/069422.

The International Search Report and Written Opinion by the International Searching Authority, issued on Aug. 7, 2008, in the PCT application No. PCT/US08/05533.

The International Search Report and Written Opinion by the International Searching Authority, issued on Dec. 18, 2009, in the PCT application No. PCT/US09/61354.

Office Action mailed on Nov. 3, 2010 in related U.S. Appl. No. 12/044,530.

Office Action mailed on Mar. 7, 2011 in related U.S. Appl. No. 12/168,504.

The extended European Search Report by the European Patent Office, issued on Jan. 16, 2012, in the corresponding European patent application No. 09716608.6.

The extended European Search Report by the European Patent Office, issued on Aug. 2, 2012, in the related European patent application No. 09822648.3.

Office Action mailed on Feb. 28, 2012 in related U.S. Appl. No. 12/168,504.

Office Actions mailed on Dec. 7, 2011 and Jun. 28, 2012 in related U.S. Appl. No. 12/582,480.

Office Action mailed on Jun. 28, 2011 in related U.S. Appl. No. 12/044,530.

Moore et al., "Weatherman: Automated, online, and predictive thermal mapping and management for data centers," Jan. 1, 2006, Autonomic Computing, 2006. ICAC '06. IEEE International Conference on Dublin, Ireland Jun. 13-16, 2006.

Raghavendra et al., "No "Power" Struggles: Coordinated Multi-level Power Management for the Data Center," http://www.hpl.hp.com/echreports/2007/HPL-2007-194.pdf, Mar. 1, 2008.

Office Actions, mailed on Dec. 13, 2011 and Sep. 14, 2012, in related U.S. Appl. No. 12/603,322.

The Chinese Office Action, issued on Nov. 5, 2012, in the related Chinese Patent Application No. 200980142324.6.

The Chinese Office Action, issued on Apr. 26, 2013, in the related Chinese Patent Application No. 200980149075.3.

The Chinese Office Action, issued on Jan. 14, 2013, in the related Chinese Patent Application No. 200880131103.4.

The Chinese Office Action, issued on Feb. 16, 2013, in the related Chinese Patent Application No. 200880129788.9.

Office Action, mailed on Aug. 20, 2013, in related U.S. Appl. No. 12/044,530.

Office Action, mailed on Aug. 29, 2013, in related U.S. Appl. No. 12/168,504.

Office Actions, mailed on Dec. 10, 2012, in related U.S. Appl. No. 12/603,322.

Office Actions, mailed on May 24, 2013 and Sep. 13, 2013, in related U.S. Appl. No. 12/582,480.

Office Actions, mailed on Apr. 19, 2013, in related U.S. Appl. No. 13/790,601.

The English translation of the Japanese Office Action issued on Jun. 18, 2013 in the related Japanese application No. 2011-533304.

The Japanese Office Action issued on Jun. 18, 2013 in the related Japanese application No. 2011-533304.

Office Action, mailed on Dec. 10, 2012, in related U.S. Appl. No. 12/603,322.

Office Action, mailed Apr. 19, 2013, in related U.S. Appl. No. 13/790,601.

U.S. Appl. No. 13/790,604, filed Mar. 8, 2013, entitled, "Methods of Achieving Cognizant Power Management."

The Chinese Office Action, issued on Dec. 18, 2013, in the related Chinese Patent Application No. 200880129789.9.

* cited by examiner

SYSTEM AND METHOD FOR EFFICIENT ASSOCIATION OF A POWER OUTLET AND DEVICE

TECHNICAL FIELD

This invention relates generally to power distribution devices, such as, power strips, and more particularly to power distribution units having certain intelligent capabilities. In particular, this application is related to U.S. patent application Ser. No. 12/168,504, entitled, "Automatic Discovery of Physical Connectivity Between Power Outlets and IT Equipment," filed on Jul. 7, 2008, and to U.S. patent application Ser. No. 12/044,530, entitled, "Environmentally Cognizant Power Management," filed on Mar. 7, 2008.

BACKGROUND OF THE INVENTION

Intelligent power distribution devices offer enhanced power distribution and monitoring capabilities for certain sensitive electrical and electronic applications. An exemplary application where deployment of intelligent power distribution devices has proven useful is in the powering of multiple computer servers that are involved in the provision of network services. Here, the ability to control and monitor power distribution can prove to be an invaluable tool for computer network operators and IT personnel.

One known intelligent power device of the above-described type is the Dominion PX Intelligent Power Distribution Unit (IPDU), developed and sold by Raritan Corp. of Somerset, N.J. The Dominion PX IPDU offers increased operational and monitoring capabilities at each of the AC power outlets included in the device. Generally, these capabilities will include the ability to turn an outlet on and off, and also provide power consumption measurements for that outlet, among other features. In order for these capabilities to be at all useful, it is necessary for the intelligent power device or equipment monitoring the intelligent power device to know what specific equipment is at the other end of a power cable plugged into each outlet of the intelligent power device.

At present, the only way to determine what equipment is associated with specific outlets of an intelligent power distribution device is to have that information manually entered. Such a manual association process may be inconvenient, subject to error and require additional manual updates any time a configuration change takes place.

SUMMARY OF THE INVENTION

An advance is made over the prior art in accordance with the principles of the present invention that is directed to a system and method for providing automatic or semi-automatic identity association between an outlet of an intelligent power distribution unit and a target device, such as a computer server, which is powered by that outlet. The association is accomplished by enabling identification information to be transmitted between an identification device near or within the target device and the intelligent power distribution unit via a power cable. The power cable may include a specialized interface for mating with the power distribution unit and/or providing the identification information.

In one exemplary embodiment of the invention, a target device is supplied power from a specific outlet of an intelligent power distribution unit. The system contains an identification device proximate the target device for receiving identification information from the target. Further, the cable for supplying power between the target device and the intelligent power distribution unit enables communication of identification information between the identification device and the intelligent power distribution unit.

In another exemplary embodiment of the present invention, a system is disclosed for automatically associating an electrical device with a electrical outlet. Wherein, the system contains an identification generating circuit for producing at least one signal used to uniquely identify the electrical device. The system further contains a first identification signal transceiver located proximate the electrical device and electrically connected to the identification generating circuit, and a second identification signal transceiver located proximate to and associated with the electrical outlet. A communications channel is disposed between the first identification signal transceiver and said second identification signal transceiver and is used to pass signals between the transceivers.

BRIEF DESCRIPTION OF THE DRAWING

The teachings of the present invention can be readily understood by considering to the following detailed description in conjunction with the accompanying drawings, in which.

DETAILED DESCRIPTION

Exemplary embodiments of the invention will now be described while referring to the figures, several of which may be simultaneously referred to during the course of the following description.

The present invention discloses a system and method for providing automatic or semi-automatic identity association between an outlet of an intelligent power distribution unit and a target device, such as a computer server, which is powered by that outlet.

Figure 1:
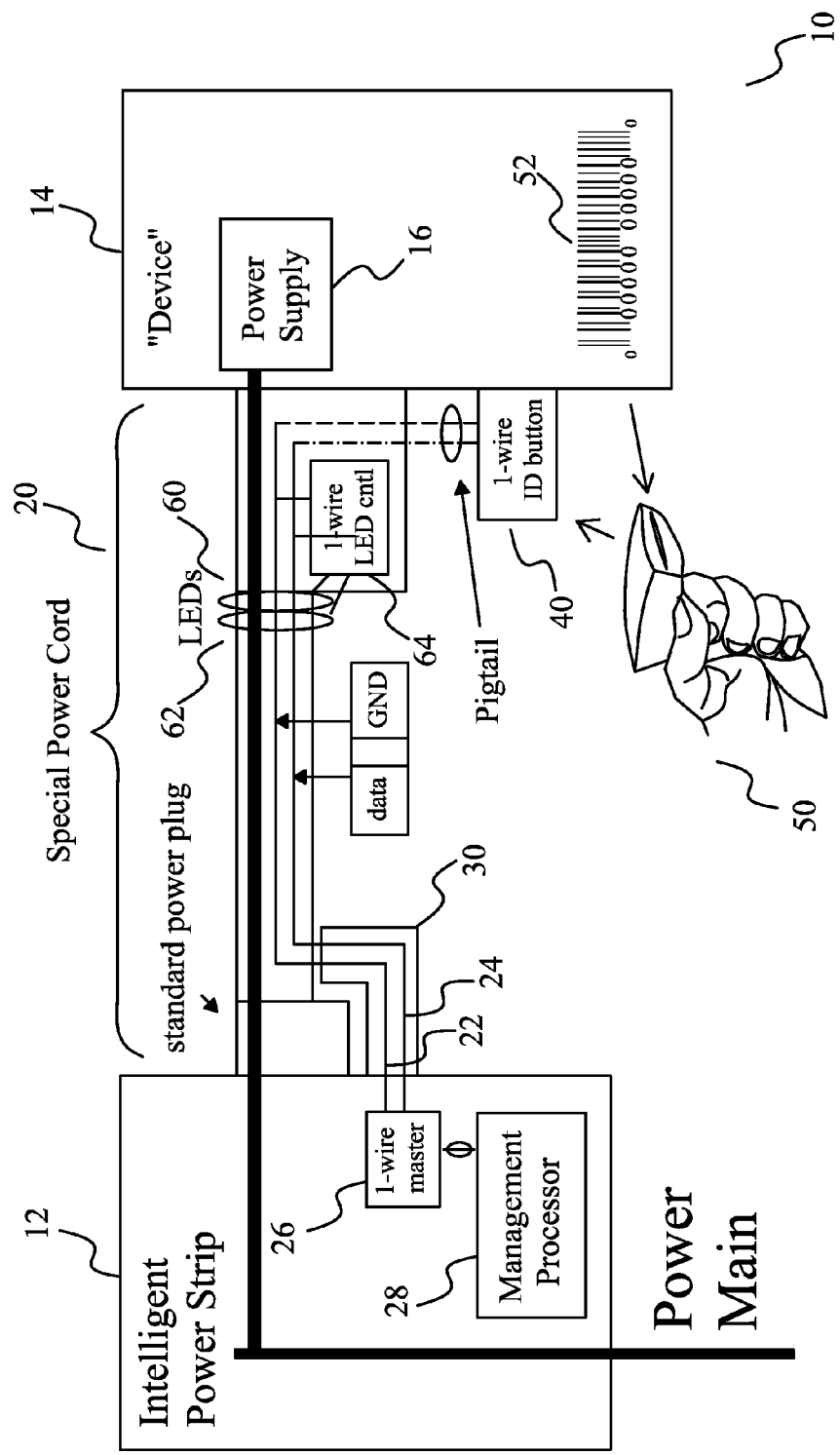
FIG. 1 shows one exemplary embodiment of a system for providing reliable association information between a target device and intelligent power distribution unit.

Referring to FIG. 1, there is shown one exemplary embodiment of a system 10 in accordance with the present invention for enabling substantially automatic identity association between an intelligent power distribution unit 12 and a target device 14, where the target device is an electrical device includes or utilizes a power supply 16 that is powered by the intelligent power distribution unit 12. As shown, the system 10 includes a specialized power cable 20 for providing AC power and current from an outlet of the power distribution unit (PDU) 12. As would be understood, the power cable 20 includes at least two power conductors for providing AC power and may or may not include a separate ground conductor depending on the power system and the country in which the system is utilized. The standard power connections of the power cable mate between the power distribution unit and the target device in a known manner.

In addition to the power connection conductors described above, the specialized power cable 20 includes two additional conductors, e.g., a data conductor 22 and ground 24 (sometimes referred to collectively as data conductors), for enabling identity data to be transmitted between the power distribution unit and target device. Although the shown embodiment is illustrated as including two additional conductors, another possible configuration includes a single data conductor, where the single data line makes use of the AC ground for its reference. Such a configuration may not be eligible, however, for approval by certification agencies or other approval agencies in a number of regions. Additional data and/or power conductors may also be included as part of the specialized power cord.

As shown, the data conductor 22 of the power cable couples on the power distribution unit side to a controller 26 within the power distribution unit 12. The controller 26, which acts as a transceiver to transmit and receive identification data from Device 14, in turn, couples to a management module or processor 28 within the power distribution unit 12. In a unique feature of the present invention, the data conductors 22, 24 of the specialized power cable 20 couple to the power distribution unit 12 by way of connections which are made, for example, through a latch unit 30 on the power distribution unit 12 and a corresponding latch plate receiving section on the collar of the power cable 20. In this way, standard methodologies of making power connections between the power distribution unit and target device are kept intact, e.g., standard two and three prong connectors. The latch unit 30 and coupling mechanism to the power cable are designed in order to keep the data conductors isolated from one another. Specific embodiments of coupling mechanisms between the power cable and the power distribution unit are described in greater detail herein. Various other designs of locking and latching mechanisms that provide coupling (and isolation) of the data conductors to the power distribution unit may also be utilized. Besides utilization of locking mechanisms, other means of securely coupling the data conductors to the power distribution unit may also be utilized.

On the opposite side of the power cable, the data conductors 22, 24 couple to an identification (ID) device 40. This would generally include a programmable memory component, such as a Read-Only Memory (ROM) or non-volatile RAM. Exemplary devices of this type are memory devices from Maxim Integrated Products of Sunnyvale, Calif. (formerly Dallas Semiconductor) that utilize the 1-Wire® protocol. The 1-Wire protocol uses a signaling scheme that performs half-duplex bidirectional communications between a host/master controller and one or more slaves sharing a common data line. Both power and data communication for slave devices are transmitted over this single line. For power delivery, slaves capture charge on an internal capacitor when the line is in a high state and then use this charge for device operation when the line is low during data transmission. The ID device 40 forms part of the identification generating circuit and is attachable to or is in an area near the target device 14 and its power input, where the ID is device is powered through the data conductors as described above. The ID device 40 is programmed to provide the power distribution unit 12, via a communications channel, such as the data conductors 22, 24, with a machine readable identification, for example a unique address number, for the target device 14.

The ID Device 40 could be programmed by any method that would give it unique information about the target device 14 usable to identify the target device. In one embodiment of the invention, the programming of the ID device is accomplished by means of a custom barcode reader 50. The barcode reader 50 enables a technician at setup to read an associated bar code 52 off of the server identification tag or asset management tag and transmit this barcode scan to the memory of the ID device 40. The transfer of information between the barcode scanner and the ID device may be accomplished via wired or wireless interface in a known manner. The bar code of the server identification tag will typically include either asset management tag information or server serial number information or any other like information for uniquely identifying the computer server target devices.

In one embodiment of the invention, the ID device 40 is attached to the data conductors of the power cable 20, wherein the data conductors pigtail off of the power cable at the target end of the cable so as to enable a desired placement of the ID device in the vicinity of the target device. As would be understood, the data lines of the power cord terminate by way of a standardized connector, where the connector is made to mate with a corresponding connector on the ID device. In this way, ID devices can remain with the corresponding target equipment and programming of an ID device need only be accomplished once. In addition, the ID devices can be replaceable if desired, in the case of equipment failure at either the target or ID device itself. As an alternative method of programming the ID Device 40, the server identification tags could also be in the form of Radio Frequency Identification ("RFID") tags, where information from the RFID tags may be obtained via an RFID reader. The RFID reader could be incorporated into the ID Device 40 or could be a separate device with an interface to the ID Device similar to the barcode reader. As a further alternative, the ID Device 40 would couple externally (and perhaps temporarily) to the target device 14 through a cable, for example, a USB cable. A software application would be loaded on the target device which automatically loads identification information from the target device to the ID Device when prompted. The software application could be loaded to the target device along with other applications at configuration time or by way of a virtual media link or other like download, where KVM (keyboard-video-mouse) type equipment would have access to the target devices to enable the software download. In the descriptions of embodiments of the innovation below, barcode readers are referred to as illustrative and it should be understood that such reference includes any method for detecting uniquely identifying information Referring still to FIG. 1, an additional useful functionality of a visual indicator is included in combination with the power cable 20 as shown. An LED 60 is placed on the target device end of the cable, ideally around the collar 62 of the power connector for maximum visibility. This LED 60 is powered and controlled by the data lines, and may provide (a) a useful indicator of whether power is enabled to the device, and (b) a marker for devices that are targeted for maintenance, to allow a repair technician to positively identity the device. An LED controller 64, for example, DS2413, manufactured by Dallas Semiconductor/Maxim Integrated Products, may be suitable for controlling one or more LEDs via the data lines. An LED device capable of producing multiple colors indicative of differing status conditions may also be utilized in connection with the LED controller. Another feature of the present invention power cable is that the LED may be manually operated by way of a button or other type switch which is included on one or both sides of the power cable. In this way, a visual indication regarding a specific power cable under deployment may be readily available to a technician. Such a feature would be advantageous when attempting to locate a specific cable among a large number of other like cables.

Other types of indications, for example, audible indications, are also possible in connection with the present invention and the disclosed architecture.

Because the power cable 20 of the present invention contains an embedded control device (for controlling the LED), the intelligent power distribution unit can distinguish between (a) disconnection of the ID device, and (b) complete disconnection of the cord lock/1 wire bus. Having the ability to report this level of device connection status is extremely useful when attempting to report and resolve connection failures in an intelligent manner.

In addition, by being able to make accurate associations between target devices 14 and the intelligent power distribution units 12 by way of the ID devices 40, improved monitoring capabilities are enabled for the entire system making use of intelligent power distribution units. For example, monitoring of the ID devices 40, once association to a target device is made, enables the intelligent power distribution device to:

a) Detect change of target ID on an outlet. Exemplary options for handling this type of condition are to send an alarm, for example, to the monitoring system, disable the corresponding outlet until the configuration is fixed, or do nothing.

b) Detect lack of target ID. This indicates that either the connection to the ID tag has failed, or else the ID tag simply has not been connected. The options again are to send an alarm, disable until fixed, or do nothing.

c) Detect an inconsistent configuration. This condition could occur, for example, if separate intelligent power distribution units detect connection to different outlets for the same target (or even the same outlet). In the case of connection to different outlets, this may be acceptable, if power redundancy is utilized at the server. However, in any case, if we know the physical locations of the power distribution units, an inconsistent configuration can be detected and we may conclude that something has gone wrong, and can generate an alarm accordingly.

d) Detect loss of connection to target ID. Assume that an exemplary power distribution policy is to require every outlet to be correctly tagged, else power cannot be enabled. If, for example, the ID device is inadvertently disconnected, by having the capabilities of the present invention, rather than shut down the target, we can see if power continues to flow to the device. If power does continue to flow, we send an alarm, for example, but don't lock out power until the outlet is disconnected or the device is shut down.

Figure 2:
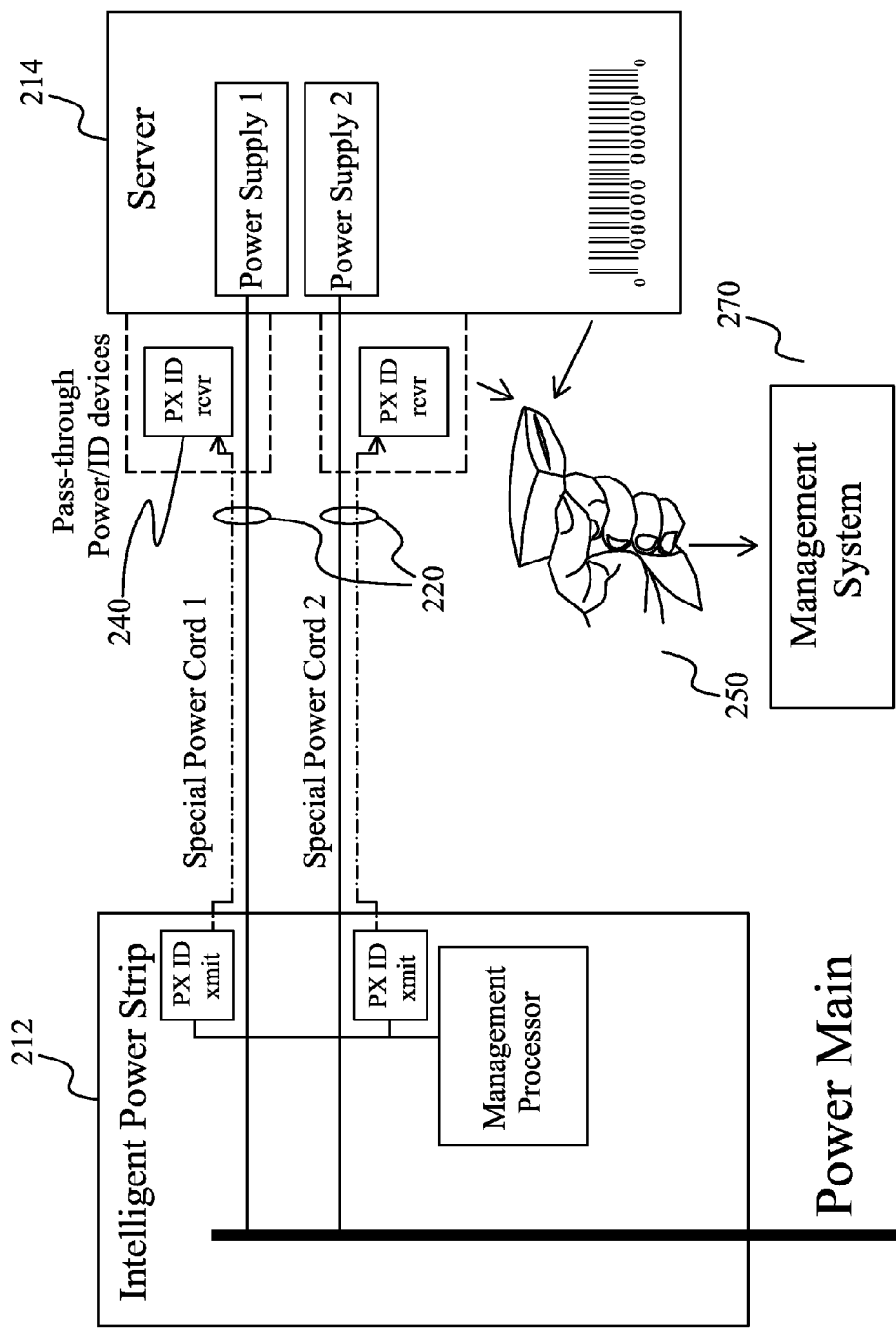
FIG. 2 shows another exemplary embodiment of a system for providing identification association between a target device and intelligent power distribution unit.

Referring to FIG. 2, another embodiment for improved association between a power distribution unit 212 and a target device 214 is described. Here, the same basic configuration of equipment is utilized for the power distribution unit 212, power cable 220 and ID device receiver 240. In this described embodiment, the power distribution unit 212 distributes a unique identity of the power distribution device and the power outlet to the ID receiver device 240 at the target device 214 or server. The association is then done in a portable device like a barcode scanner 250. That is, the power distribution unit 212, e.g., power strip, communicates a value associated with its ID and the ID of the outlet over the power cable 220, where it is placed into readable form at the end of the cable, for example, in the ID device receiver 240. The distribution of addresses from the power distribution unit can be based, for example, on information that is provided to the PDUs from a management system. In addition, detailed custom identification information (as opposed to more simple address information) could also be loaded to the ID devices based on that information being cascaded from the management system to the PDUs and then to the ID devices. Another alternative is that a default set of addresses is always provided from the PDU to corresponding ID devices and therefore, the association mechanism need also keep track of the specific PDU identification, e.g., a PDU number, in order to make a proper association.

After connecting the power cord to an outlet of the power distribution unit in order to download identification information to the ID devices, an individual uses the barcode scanner 250 (or similarly functioning device) to scan the server's barcode (or other like pertinent information), and then "reads" the end of each power cable to create an association inside the barcode scanner. The association information is uploaded to a management system 270 or database, either in real time if there is an active connection between the detecting device and the management system or at a later time when such a connection can be made. Since the flow of information to the ID receiver device is unidirectional, devices utilizing a bidirectional communication protocol need not be utilized, as would be understood by those skilled in the art.

While this system is manual in some respects, it automatically brings the power socket ID to the exact location at the back of the server. Accordingly, the effort and potential for error in tracing the power cable from the server input to the power strip is eliminated.

Figure 3:
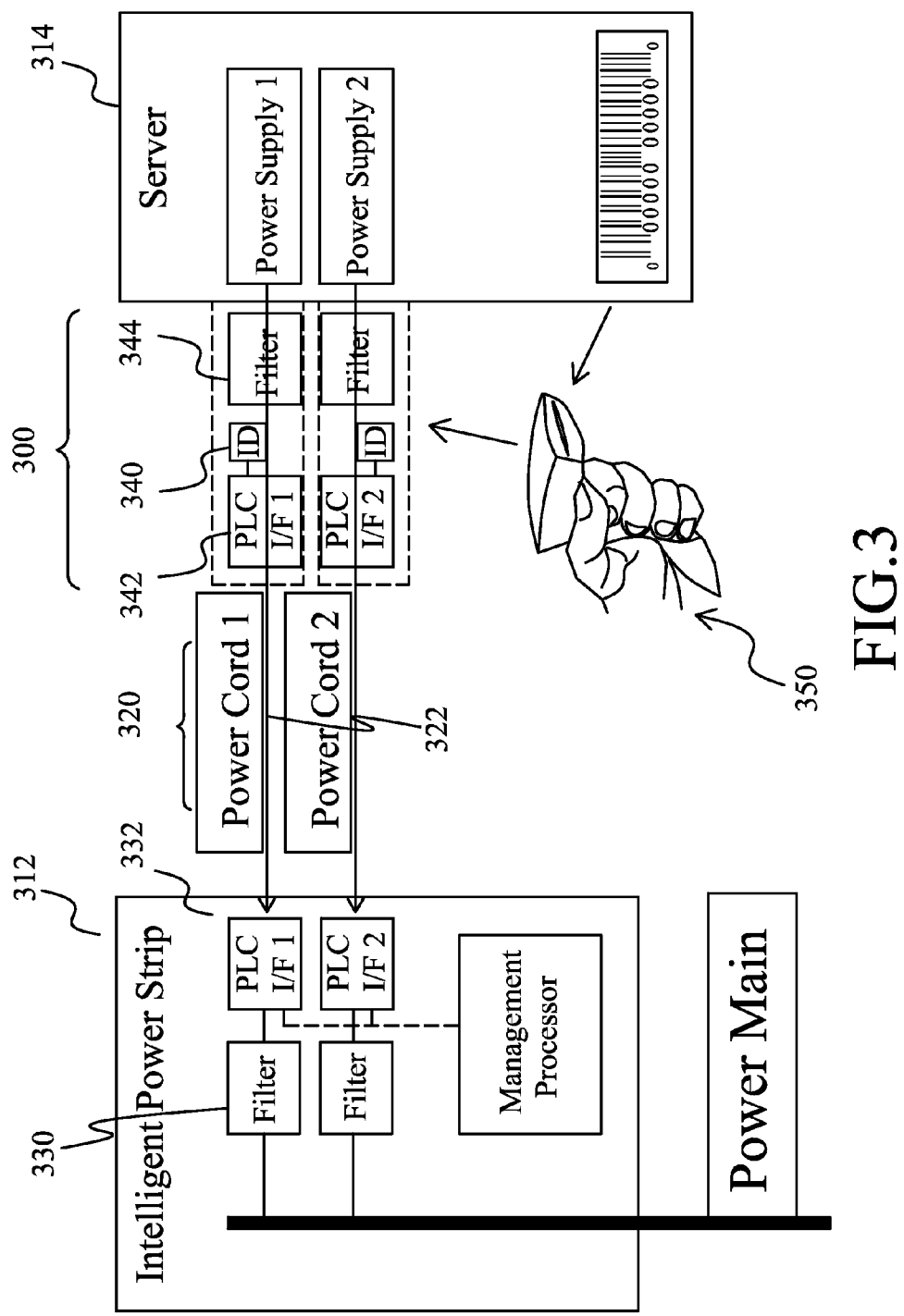
FIGS. 3 and 4 show alternative exemplary embodiments for associating a target device to an intelligent power distribution unit using power conductors of a power cable to provide communication.

Referring to FIG. 3, there is shown another exemplary embodiment of a system 300 and method for improved association between an intelligent power distribution unit 312 and a target device 314. As in the systems described in respect to FIGS. 1 and 2, the system 300 of FIG. 3 makes use of an ID device 340 that is coupled to the power cable 320 and is located proximate the target device 314. The embodiment of FIG. 3 differs, however, in that communication between the intelligent power distribution unit 312 and ID device 340 takes place via the actual power conductors 322 of the power cable 320. For this solution, each outlet on the power strip has the ability to communicate through its corresponding socket over the power conductors 322. At the power distribution unit, a filter 330 is installed "behind" the power line communications interface 332 to keep each communication link isolated from each other (rather than colliding on the power main). The power line communications interface 332 enables data to be received over the power line connection and input to the management processor 328 of the intelligent power distribution unit. This can be accomplished, for example, through the use of a power line modem or other like device that provides isolation from the power system and enables a digital data protocol to be received at the management processor. An example of a suitable power line communications interface can be found in the PlugLink product line from Asoka USA Corporation.

On the target (or server) side of the power cable 320, a complementary interface 342 is provided as part of a pass-through device 344 for each power input of a device, where, as would be understood, many devices support multiple power inputs, either for load sharing or for redundancy purposes. An ID device 340 or other like memory component within the pass-through device 344 is programmed with the server identification information (and perhaps the power input number) by way of an input device 350, such as a bar code scanner, as described with respect to FIG. 1. When power is turned on, the power distribution unit 312 queries the ID device 340 at the target device 314, and obtains the server identification. At this point, the outlet identification and the target device identification are both known by the outlet strip. The association may be kept internal to the strip or forwarded to a centralized management system.

In alternate operation for the system of FIG. 3, the power distribution unit 312 can also push its identification information over to the ID device 340 as described with respect to FIG. 2. An association between the server information and the information captured from the ID device would then be made via a handheld device as previously described. The association information as captured by the device would then be downloaded or transferred for use by a management system.

Figure 4:
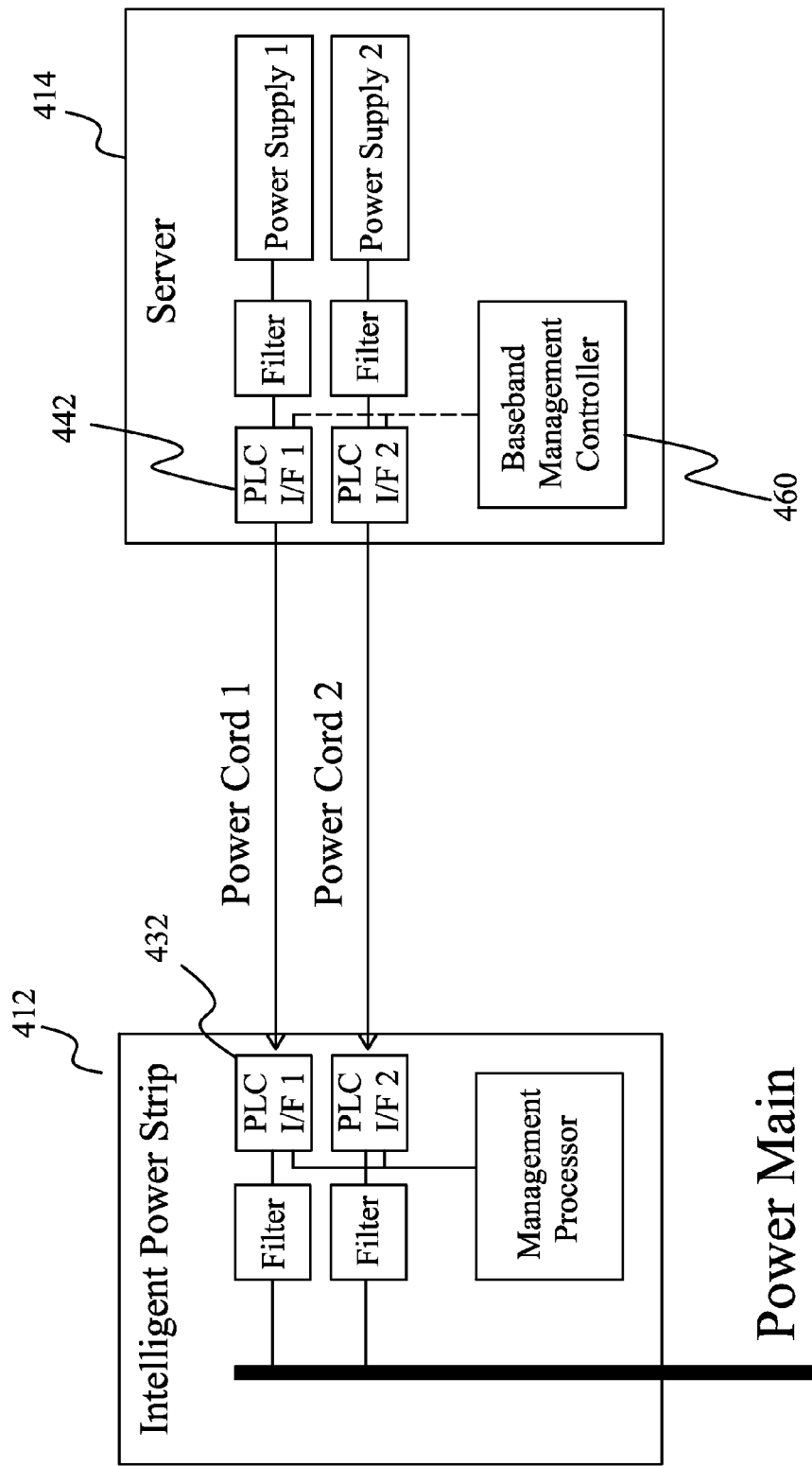

Referring to FIG. 4, another alternate embodiment of the present invention is shown. In this approach, power line communications is again employed to transmit target identifying information to the power distribution unit 412, across a standard power cord 412. At the power distribution unit 412, the power line interface 432 is similar to the interface described with respect to FIG. 3.

Rather than a pass-through device, however, a complementary power line interface 442 is provided within the server or other target device 414 on each power input. Each interface includes memory and is provided with the server identification information, and the power input number from a location within the target device, for example, the Baseband Management Controller 460. Alternately, the server identification information would be embedded or stored within the power supply, if for example, these power supplies were not swappable at the target device.

When power is turned on, the power strip queries the target device, and obtains the server identification from the interface 442 of the target device 414. At this point, the outlet identification and the target device identification are both known by the power distribution unit (e.g., outlet strip). As with certain other embodiments of the invention, the association may be kept internal to the strip or forwarded to a centralized management system.

This solution offers the benefit of being fully automatic. All an installer needs to do is plug the system together and automatic association between the target device and power distribution unit will occur. A drawback to this implementation is that it will only work properly if the target device manufacturer includes this functionality in its product.

Figure 5:
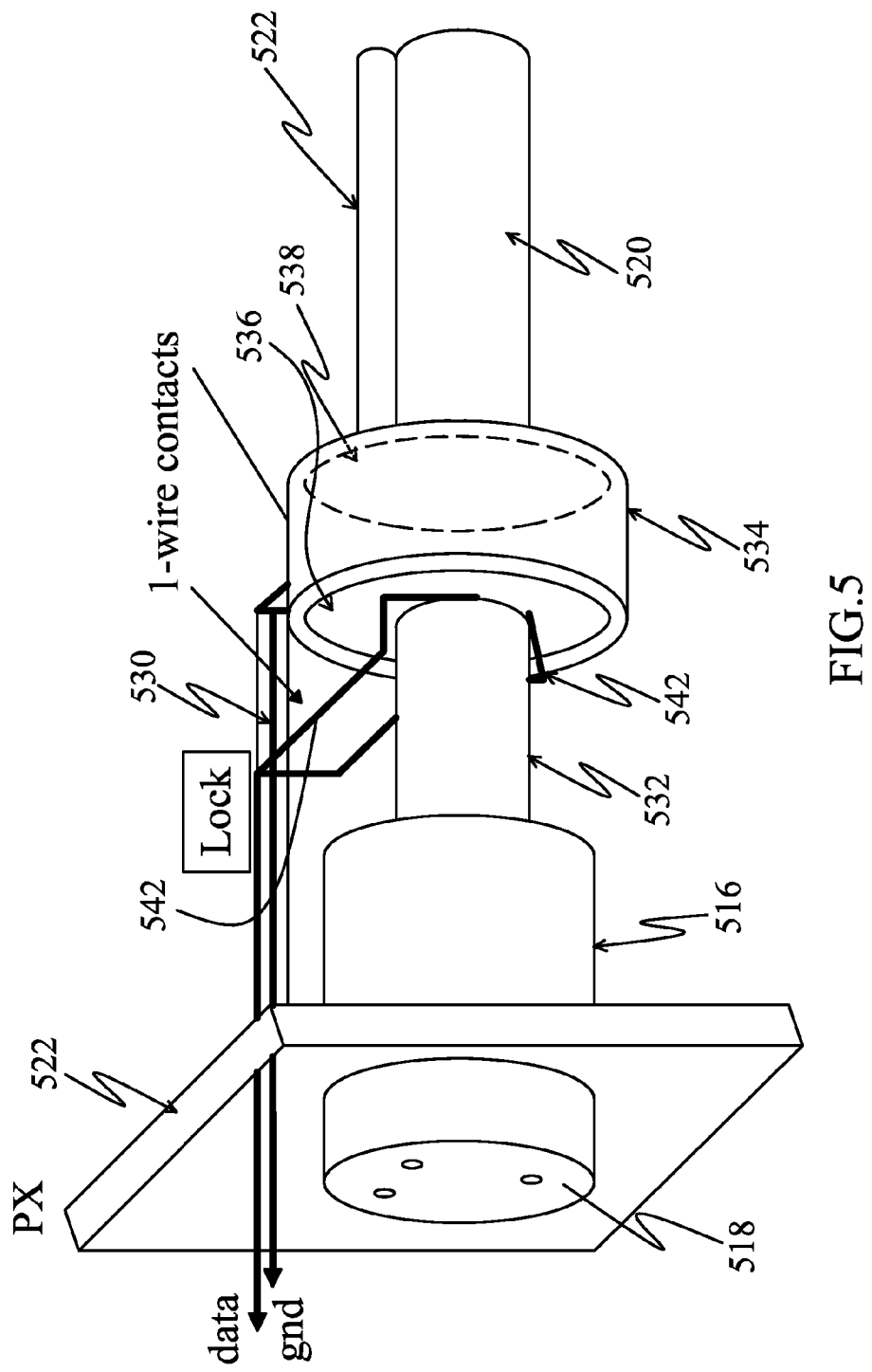
FIGS. 5 and 6 show an exemplary illustration of a coupling mechanism between the intelligent power distribution unit and specialized power cable.
Figure 6:
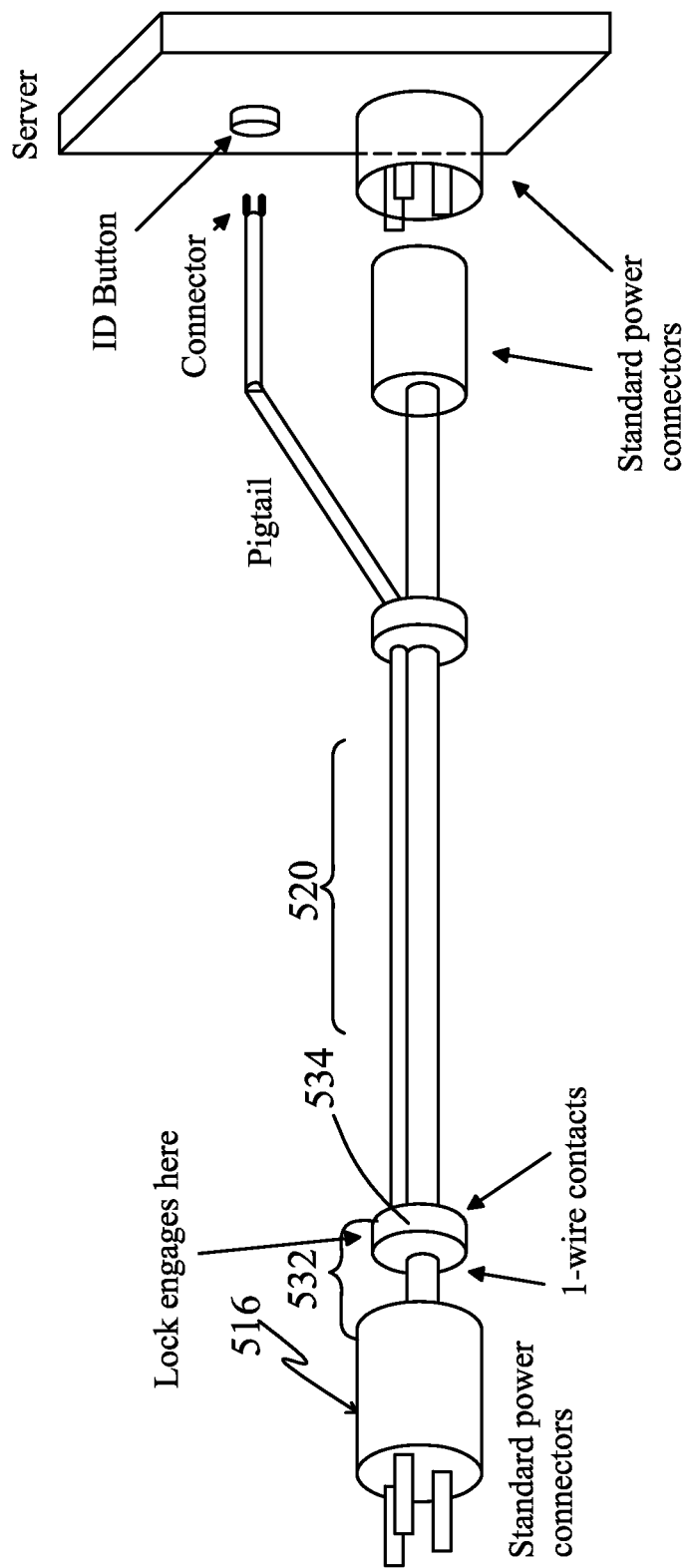

Referring to FIG. 5 in combination with FIG. 6, there is shown one exemplary embodiment of a coupling mechanism 500 between the power cable 520 of the present invention and the power distribution unit 512 that is particularly applicable to the embodiments described with respect to FIGS. 1 and 2. A male connector 516 is shown having a conventional three prong arrangement that is insertable into a conventional 110V North American outlet 518. The power cable 520 in proximity to the male connector 516, however, includes a specialized collar 532 that is adapted to couple with a latch or lock mechanism 530 from the PDU. As shown, the power cable 520 of the present invention includes two sets of conductors, data conductors 522 and power conductors 524, each of which are separately contained in insulation. On the PDU side of the power cable, the data conductors terminate within a two sided disc housing 534 for containing two conductive discs 536, 538. Each of the data conductors 522 (e.g., data and ground) is electrically coupled to one of the conductive discs.

The latch portion 530 of the coupling mechanism 500 includes two sets of opposing contacts 542 that slip over the insulated power cable 520 and which have a number of points 544 along the contacts 542 that electrically couple to the electrically conductive discs 536, 538 in order to electrically connect the data conductors 522 with the controller of the PDU 512. The data conductors of the latch mechanism 530 which couple with respective sets of contacts 542 are included within or connected to the latch so that the data conductor may electrically couple to the controller within the PDU 512. The latch mechanism 530 of the PDU has a pivot proximate its connection at the PDU. The pivot allows the latch to be maneuvered on and off of the collar 532 of the power cable 520 when the connector 516 of the power cable needs to be inserted or removed from a power receptacle of the PDU 512.

Figure 7:
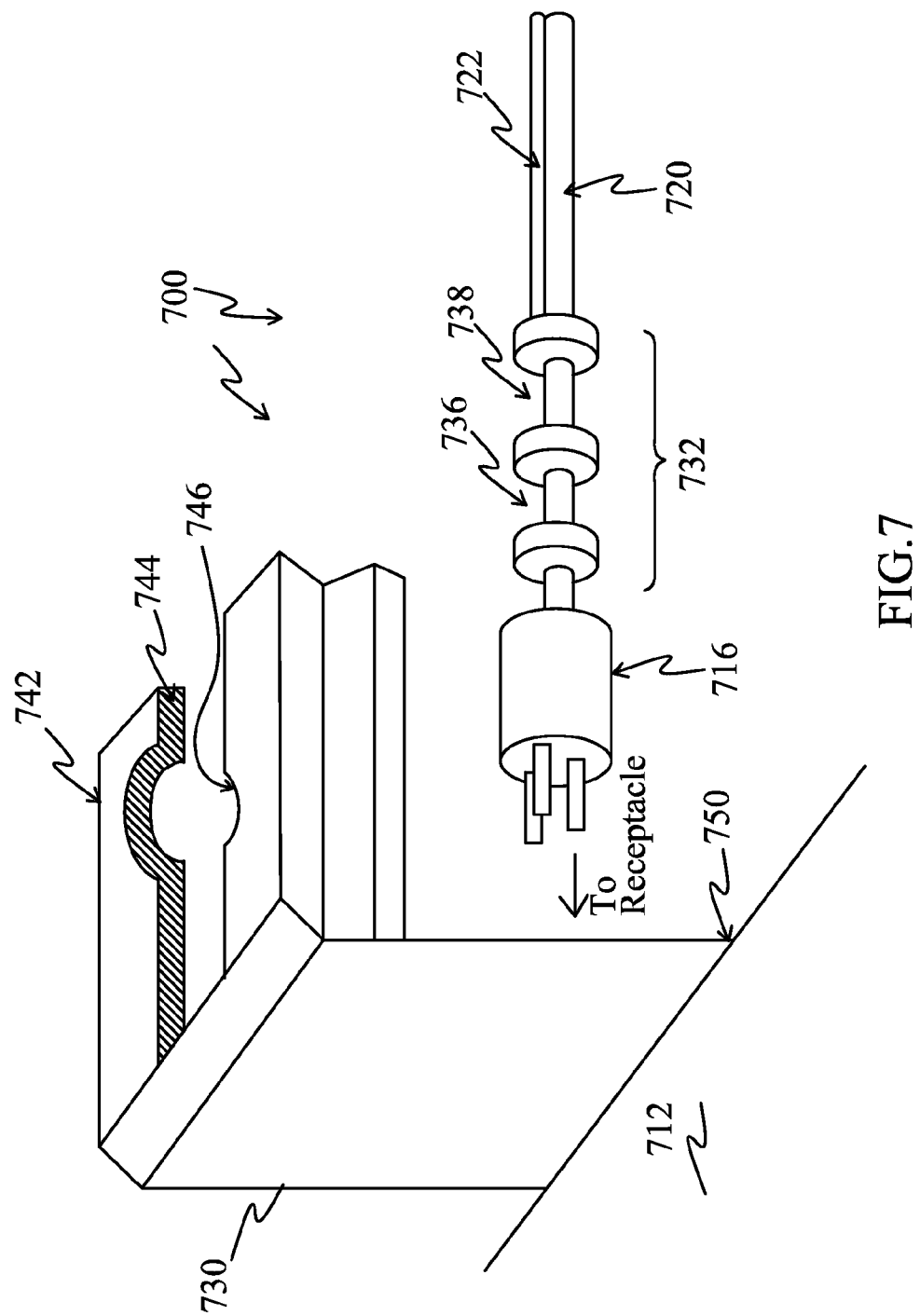
FIG. 7 shows another exemplary embodiment of a coupling mechanism between the intelligent power distribution unit and specialized power cable according to the present invention.

Referring to FIG. 7, another embodiment of a coupling mechanism 700 for connecting the power cable of the present invention with an intelligent power distribution unit is shown. The male connector 716 includes a specialized collar 732 that is adapted to couple with the latch or lock mechanism 730 from the PDU. As shown, the collar includes two separate slots 736, 738 having electrically conductive material surrounding at least portions thereof. The conductive material of the slots electrically couples to respective ones of the data conductors 722 that are included within the cable 720.

The latch portion 730 of the coupling mechanism 700 includes a specialized connector 742 that is adapted to be received and couple with the corresponding slots 736, 738 of the power cable. The latch 730 includes a slotted opening 740 that fits over and maintains a force fit connection with the conductive material 742 found in the corresponding slots 736, 738 of the power cable collar. The latch has separate corresponding conductors 744, 746 that make contact with the conductive slots in a manner similar to that of an insulation displacement (IDC) connector. The conductors of the latch mechanism are included within or connected to the latch so that the data conductor may electrically couple to the controller within the PDU. The latch mechanism of the PDU has a pivot 750 proximate its connection at the PDU. The pivot 750 allows the latch to be maneuvered on and off of the collar 732 of the power cable when the connector 716 of the power cable needs to be inserted or removed from a power receptacle of the PDU.

In other alternate embodiments of the present invention, the power cable of the present invention having additional conductors for providing the identification information to the intelligent power distribution unit may couple to the power distribution unit in the power connector region using additional prongs that are insertable into an outlet region. Alternately, complimentary contacts or tabs may also be included in or around the power connector region in order to couple the additional conductors to the power distribution unit. In addition, although a single wire interface is preferable in order to limit the number of conductors that must be present in the power cable, it would be understood that additional conductors may be utilized within the power cable in order to make use of conventional data transmission protocols.

The foregoing description merely illustrates the principles of the invention. It will thus be appreciated that those skilled in the art will be able to devise various arrangements, which, although not explicitly described or shown herein, embody the principles of the invention, and are included within its spirit and scope. Furthermore, all examples and conditional language recited are principally intended expressly to be only for instructive purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Many other modifications and applications of the principles of the invention will be apparent to those skilled in the art and are contemplated by the teachings herein. Accordingly, the scope of the invention is limited only by the claims.

What is claimed is:

1. A system for associating a target device having power supplied by an intelligent power distribution unit with a specific outlet of said power distribution unit, said system comprising:
   an identification device for receiving a signal providing identification information of said target device and storing said identification information, said identification device locatable proximate said target device;
   a cable for supplying power to said target device, wherein said cable is connected to said specific power outlet and enables communication of said identification information between said identification device and said intelligent power distribution unit;
   a receiver for receiving said identification information from said identification device via said cable connected to said specific power outlet; and
   a management processor for associating said identification information with identification information for said specific power outlet,
   wherein said identification device is programmable with identification information using a programming device, said programming device being configured to wirelessly receive identification information of said target device and to transfer said identification information to said identification device.

2. The system of claim 1, wherein said cable includes at least one additional conductor in addition to those conductors providing power to said target device, said additional conductor used to provide said communication of said identification information.

3. The system of claim 2, wherein said at least one additional conductor couples to said power distribution unit by way of one or more contacts provided proximate a connector of said cable.

4. The system of claim 3, wherein said contacts couple to said power distribution unit in an area outside of a conventional receptacle attachment area.

5. The system of claim 4, wherein said contacts couple to said power distribution unit through a lock mechanism that secures said cable to said power distribution unit.

6. The system of claim 1, wherein said identification information is communicated from said identification device to said power distribution unit using at least one power conductor, said receiver receiving said identification information from said power conductor.

7. The system of claim 6, wherein said receiver includes a filter for separating said identification information from an AC signal.

8. The system of claim 1, wherein said power distribution unit is operable to provide identification information to said identification device.

9. The system of claim 1, further including a field association device for receiving the identification information from the target device and identification information from the identification device and making an association therein, wherein association information regarding said target device and said corresponding identification device is electronically transferable for use by a management system for monitoring said intelligent power distribution units.

10. The system of claim 1, wherein said power cable includes a selectively operable visual or audible indicator at a target end thereof.

11. The system of claim 1, wherein said identification information regarding said target device is automatically provided from said target device to said intelligent power distribution unit.

12. The system of claim 1, wherein said programming device comprises a wireless receiver selected from the group consisting of barcode scanners and RFID readers.

13. A method of making an association between a target device and a specific electrical outlet of an intelligent power distribution unit providing power to said target device, said method comprising the steps of:
   receiving a signal providing identification information of said target device at an identification device located proximate said target device, wherein said identification device is provided with said signal by a programming device that is operable to wirelessly receive identification information regarding said target device and transfer said identification information to said identification device;
   storing said identification information of said target device at said identification device; and
   communicating said identification information over a cable that is coupled to said specific electrical outlet and supplies power to said target device, such that an accurate association and monitoring of a target device having power supplied by the specific outlet may be made.

14. The method of claim 13, wherein said cable includes at least one additional conductor for communicating said identification information.

15. The method of claim 14, wherein said at least one additional conductor couples to said power distribution unit via a lock apparatus adjacent to AC power connection at said power distribution unit.

16. The method of claim 13, wherein said identification device is programmable with identification information using a field programming device, said field programming device operable to receive identification information regarding said target device and transfer said identification information to said identification device.

17. The method of claim 13, further including receiving identification information from a target device and a corresponding identification device at a field association device and making an association therein, wherein association information regarding said target device and said corresponding identification device is electronically transferable for use by a management system for monitoring said intelligent power distribution units.

18. The method of claim 13, wherein said programming device comprises a wireless receiver selected from the group consisting of barcode scanners and RFID readers.

19. An apparatus used to associate a target device having power supplied by an intelligent power distribution unit with a specific outlet of said power distribution unit, said apparatus comprising:
- an identification device for receiving a signal providing identification information of said target device and storing said identification information;
- a cable for supplying power to said target device, said cable having two or more conductors coupled at a power distribution end to said specific outlet and at least one additional conductor to enable communication of said identification information by said identification device to said intelligent power distribution unit;
- a connector on said cable at said power distribution unit end, wherein said at least one additional conductor couples to said power distribution unit via a lock apparatus adjacent to AC power connection at said power distribution unit, the lock apparatus comprising opposing electrical conductors for contacting an electrically-conductive portion of a sheath of the at least one additional conductor; and
- a management processor for associating said identification information communicated to said intelligent power distribution unit with identification information for said specific power outlet.

20. A system for automatically associating an electrical device with an electrical outlet from which said electrical device draws electric current comprising:
- a first identification signal transceiver located proximate to said electrical device;
- a second identification signal transceiver located proximate to and associated with said electrical outlet;
- a communications channel disposed between said first identification signal transceiver and said second identification signal transceiver utilized for passing at least one signal for uniquely identifying said electrical outlet from said second identification signal transceiver to said first identification signal transceiver;
- a programming device configured to wirelessly receive identification information regarding said electrical device and to receive said at least one signal for uniquely identifying said electrical outlet; and
- a management module in communication with said programming device for associating said identification information regarding said electrical device with said at least one signal for uniquely identifying said electrical outlet.

21. The system of claim 20 wherein the programming device comprises:
- a bar code reader used to read a bar code attached to said electrical device.

22. The system of claim 20 wherein the communication channel comprises a medium selected from the group consisting of:
- conductor cables supplying the electrical current from said outlet to said electrical device and at least one data conduction wire located within a power cord used to connect said electrical device to said outlet.

23. The system of claim 20 wherein a representation of said association between said at least one signal for uniquely identifying said electrical outlet and said identification information regarding said electrical device is stored in an identification element of the management module.

24. The system of claim 23 wherein said management module is connected to a network and said association between said at least one electrical device signal and said at least one signal for uniquely identifying said electrical outlet may be accessed remotely through said network.

25. The system of claim 20, wherein the programming device comprises a wireless receiver selected from the group consisting of barcode scanners and RFID readers.

26. An apparatus used to associate a target device with a specific electrical outlet supplying power thereto, said apparatus comprising:
- an identification device for receiving a signal providing identification information of said target device and storing said identification information in a memory device of said identification device, said identification device located proximate said target device;
- a cable having two or more conductors for supplying power to said target device, said cable having at least one additional conductor to enable communication of said identification information from said memory device located proximate said target device;
- a power distribution unit for supplying power to said target device via said cable, said power distribution unit including a plurality of electrical outlets;
- a management module having a processor and associated memory for storing said identification information provided over said at least one additional conductor; and
- a latch unit on said power distribution unit located proximate electrical outlets thereof for coupling with an electrically-conductive portion of a sheath of said at least one additional conductor in order to electrically couple said at least one additional conductor to said management module.

* * * * *